US012656913B1

(12) United States Patent　　　　(10) Patent No.:　US 12,656,913 B1
Alameh et al.　　　　　　　　　　　(45) Date of Patent:　　Jun. 16, 2026

(54) SYSTEM AND METHOD FOR CAPACITIVE INFORMATION HANDLING SYSTEM HOUSING AND PERIMETER SENSORS

(71) Applicant: Dell Products LP, Round Rock, TX (US)

(72) Inventors: Rachid M. Alameh, Crystal Lake, IL (US); Jarrett Simerson, Northbrook, IL (US); Daniel L. Hamlin, Round Rock, TX (US); Jace W. Files, Round Rock, TX (US); Gerald Rene Pelissier, Santa Clara, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/038,465

(22) Filed: Jan. 27, 2025

(51) Int. Cl.
　　*G06F 3/044*　　　(2006.01)
　　*G06F 1/16*　　　　(2006.01)

(52) U.S. Cl.
　　CPC ............ *G06F 3/044* (2013.01); *G06F 1/1616* (2013.01)

(58) Field of Classification Search
　　CPC ............................... G06F 3/044; G06F 1/1616
　　See application file for complete search history.

(56) References Cited

U.S. PATENT DOCUMENTS

| | | | |
|---|---|---|---|
| 11,994,928 | B1 | 5/2024 | Alameh |
| 2009/0140863 | A1 | 6/2009 | Liu |
| 2011/0012840 | A1 | 1/2011 | Hotelling |
| 2013/0293490 | A1 | 11/2013 | Ward |
| 2014/0176447 | A1 | 6/2014 | Alameh |
| 2017/0334392 | A1 | 11/2017 | Frey |
| 2020/0136668 | A1* | 4/2020 | Chu ...................... G06F 1/1616 |
| 2023/0088535 | A1 | 3/2023 | Schulman |
| 2024/0103645 | A1 | 3/2024 | Andre |

* cited by examiner

*Primary Examiner* — Yaron Cohen
(74) *Attorney, Agent, or Firm* — Prol Intellectual Property Law, PLLC; H. Kenneth Prol

(57)　　　　　　ABSTRACT

A system and method to detect user presence near and capacitive touch of a user at an exterior chassis housing of an information handling system that includes a hardware processor, a data storage device, and a power management unit (PMU) to provide power to the hardware processor and data storage device. The system includes an exterior chassis housing capacitive sensor to detect user proximity near or touch of on an exterior chassis housing surface of the information handling system and a perimeter capacitive sensor to detect user grip of the information handling system when a grounding source of the exterior chassis housing is removed during periodic, brief sense state time duration windows. A capacitive sensor microprocessor to periodically switch the exterior chassis housing capacitive sensor and perimeter capacitive sensor to a sense state to detect user proximity to, capacitive touch of, or grip of the exterior chassis housing.

20 Claims, 7 Drawing Sheets

700

SYSTEM AND METHOD FOR CAPACITIVE INFORMATION HANDLING SYSTEM HOUSING AND PERIMETER SENSORS

FIELD OF THE DISCLOSURE

The present disclosure generally relates to a system and method for capacitive information handling system housing and perimeter sensors. The present disclosure more specifically relates systems and methods for capacitive information handling system housing and perimeter sensors that sequentially switches capacitive detection of user presence and touch.

BACKGROUND

As the value and use of information continues to increase, individuals and businesses seek additional ways to process and store information. One option available are information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications such as for teleconferencing, word processing, sales systems, business software, gaming applications, or the like. In some embodiments, a voice interface via a microphone and speaker may be used with an information handling system for access and input commands.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
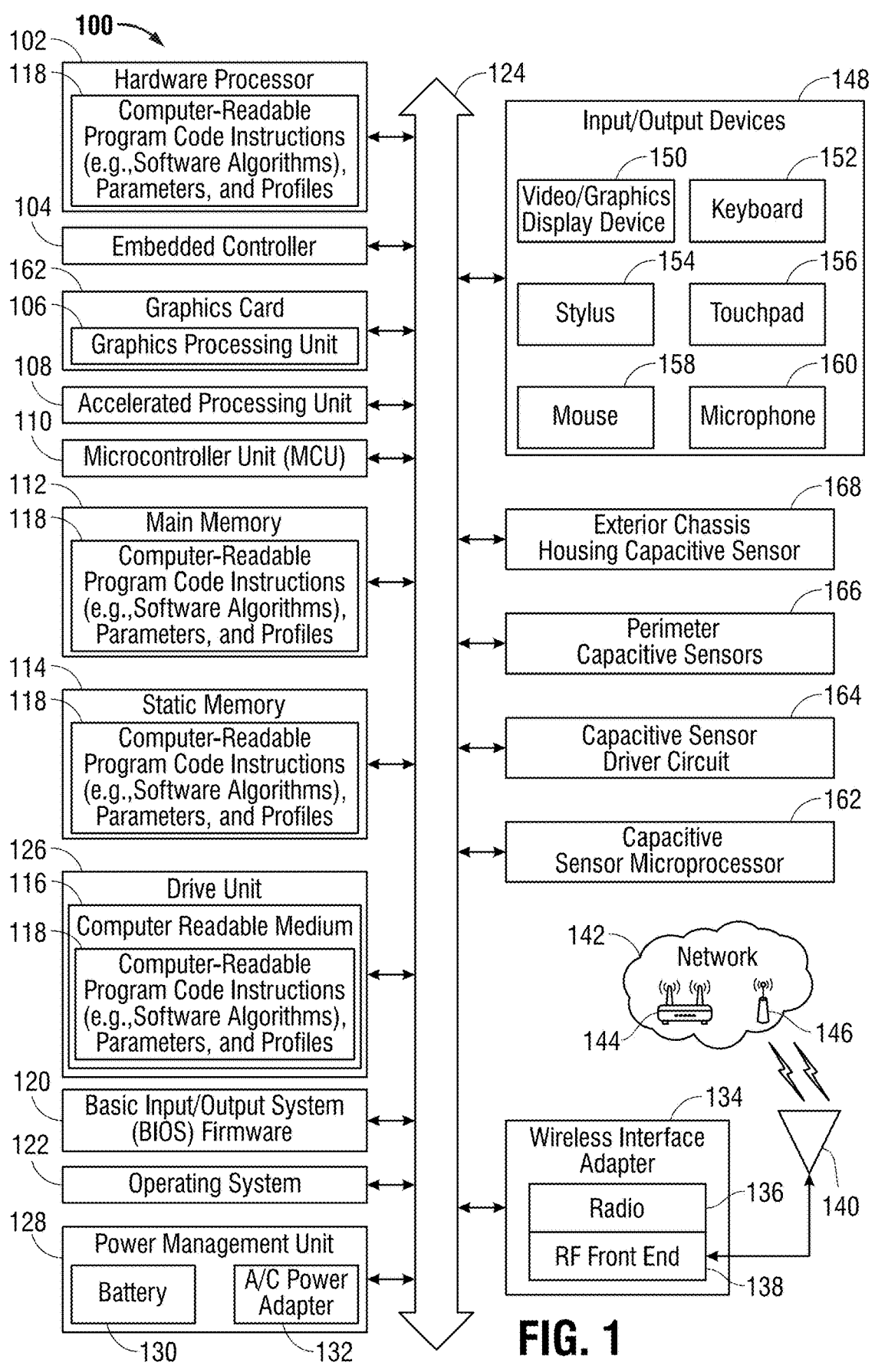
FIG. 1 is a block diagram illustrating an information handling system executing computer-readable program code instructions to detect user presence near and capacitive touch of a user with an exterior chassis housing at the information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may implement a number and variety of sensors that may provide data to a hardware processor of the information handling system in order to provide, for example, context data. This context data may be used to determine operating conditions, environments, and functions of the information handling system in order to, for example, cause the information handling system to change operating parameters and to enable security procedures. One of these types of sensors include capacitive sensors. Capacitive sensors may detect the presence of a person around the information handling system as well as the touch of the person at the information handling system.

The present specification describes a capacitive system and more specifically capacitive system of the self capacitive technology—known in the art as hover capacitive sensor (as opposed to mutual capacitive technology) for an exterior chassis housing and a one or more perimeter capacitive sensors that can detect user presence near the information handling system, touch by the user on the exterior chassis housing of the information handling system and gripping on a side of the information handling system by the user. The information handling system executing computer-readable program code instructions to detect user presence near and capacitive touch of a user with the exterior chassis housing at the information handling system includes a hardware processor, a data storage device, and a power management unit (PMU) to provide power to the hardware processor and data storage device. The information handling system may further include an exterior chassis housing capacitive sensor using the exterior chassis housing as a capacitor to detect user proximity near the exterior chassis housing of the information handling system or a user touch input on a surface of the exterior chassis housing when a grounding source of the exterior chassis housing is varied intermittently and briefly disengaged or a high pass filter is used for high frequency current grounding for electromagnetic interference (EMI) while allowing the exterior chassis housing to be driven as a capacitive sensor. In another embodiment, the exterior chassis housing may be driven as an exterior chassis housing capacitive sensor at the same time as the chassis is high-frequency grounded via the high pass filter and without momentarily reverting the chassis ground to a chassis sensor. In an embodiment, the information handling system further comprises one or more perimeter capacitive sensors used to detect user grip of the exterior chassis housing of the information handling system and details on which side the computer is gripped. In an embodiment, a capacitive sensor microprocessor may operate to periodically switch the exterior chassis housing capacitive sensor on at the exterior chassis housing to a sense state to detect user proximity and capacitive touch with the exterior chassis housing. In another embodiment, a capacitive sensor microprocessor may operate to periodically switch the perimeter capacitive sensors on to a sense state that may operate as a grip sensor of the exterior chassis housing for the information handling system in embodiments herein.

In an embodiment, the capacitive sensor microprocessor periodically switches the exterior chassis housing capacitive sensor and perimeter capacitive sensor on for a sense state lasting a periodic, brief sense state time duration window once every period interval. For example, once every period interval of a half second, the capacitive sensor microprocessor periodically switches off grounding the chassis while the exterior chassis housing capacitive sensor and perimeter capacitive sensor(s) are switched on and perimeter sensing is enabled for 5 ms each. This results in 98% grounding followed by 2% sensing of which 1% sensing for exterior chassis housing capacitive sensor and 1% sensing for exterior chassis perimeter capacitive sensor(s). In an embodiment, all sensors including the exterior chassis housing capacitive sensor and plural perimeter capacitive sensors are run sequentially in time such that no sensor is on at the same time. In an embodiment, the exterior chassis housing capacitive sensor, using the exterior chassis housing, is switched to the sense state by operatively coupling the exterior chassis housing to a capacitive sensor driver circuit that is a stand-alone integrated circuit chip or software/firmware executing on a capacitive sensor microprocessor and disconnecting the exterior chassis housing from a grounding source for periodic, brief sense state time duration windows in an embodiment (e.g., 1% of time, i.e. 5 ms every ½ second). Similarly, the perimeter capacitor sensor may be switched to a sense state by operatively coupling the exterior chassis housing to a capacitive sensor driver circuit and disconnecting the exterior chassis housing from a grounding source for periodic, brief sense state time duration windows in another embodiments (e.g., another 1% of time 5 ms every ½ second). In embodiments herein, both the exterior chassis housing capacitive sensor and the perimeter capacitor sensor may be sequentially switched to a sense state by operatively coupling the exterior chassis housing to a capacitive sensor driver circuit and disconnecting the exterior chassis housing from a grounding source for the periodic, brief sense state time duration windows in other embodiments such that the exterior chassis housing capacitive sensor may operate as a touch input node for user inputs or as a proximity sensor node sequentially with the perimeter capacitive sensor operating as a grip sensor during this periodic, brief sense state time duration window. In some embodiments with active shielding, also referred to as driven shields, between the exterior chassis housing and the perimeter capacitive sensor, both the exterior chassis housing operating as the exterior chassis housing capacitive sensor and the perimeter capacitive sensor may be simultaneously switched to a sense state in the same periodic, brief sense state time duration windows. In other embodiments where the spacing between exterior housing chassis capacitive sensor and internal hardware or perimeter capacitive sensors and internal hardware is too close and impacts capacitive operation, a driven shield is used to for active shielding overcome the close distance and allow the exterior housing chassis capacitive sensor or the perimeter capacitive sensor to work as designed and prevent the close internal hardware from load the capacitive sensor driver circuit to ground and cause range reduction in the capacitive sensing.

In an embodiment, the perimeter capacitive sensor on or at the exterior chassis housing includes an insulating layer, a capacitive sensing layer, an adhesive layer, and an electrical lead operatively coupling the capacitive sensing layer to the capacitive sensor driver by way of a via or flex formed through the adhesive layer and the exterior chassis housing of the information handling system. In another embodiment, the perimeter capacitive sensor on or at the exterior chassis housing may include a first insulating layer, a capacitive sensing layer, a second insulating layer, an active shield layer, an adhesive layer, and an electrical lead operatively coupling the capacitive sensing layer to the capacitive sensor driver circuit by way of a via or flex formed through the second insulating layer, the adhesive layer, and the exterior chassis housing of the information handling system.

The operation of the exterior chassis housing capacitive sensor as a single touch input node and allows for the information handling system to determine operative inputs or operating context data for touch inputs on the exterior chassis housing or proximity sensing by the same for context such as when a user is near the information handling system and when the user is walking away or towards the information handling system, or providing touch input. The one or more perimeter capacitive sensors on or at the exterior chassis housing allows for the information handling system to determine operating context data such as when the user is gripping the information handling system, or when the user is transitioning from gripping the information handling system. Thus, embodiments of the present disclosure provide for additional input/output (IO) capabilities via the exterior chassis housing of the information handling system for sensing or IO commands as well as context data such as proximity or grip, among other data. With this context data, the information handling system may mitigate specific absorption rates (SARs) of electromagnetic (EM) energy emitted by an antenna by assessing the grip sensor near the antenna. Other operational modifications may be made to increase the operability and functionality of the information handling system.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Computer-readable program code instructions stored in static memory 114, main memory 112, or drive unit 126 may be involved in invoking such computer-readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a keyboard 152, a video/graphics display device 150, a microphone 160, or any combination thereof. Further, various wired or wireless input and output (I/O) devices 148, such as a microphone 160, speaker 168, a trackpad 156, a stylus 154, a keyboard 152, a video/graphics display device 150, mouse 158, or any combination thereof may be integrated into the chassis of the information handling system 100 in other embodiments. Portions of an information handling system 100 may themselves be considered information handling systems 100.

Information handling system 100 may include devices or modules that embody one or more of the devices or execute instructions for one or more systems and modules. The information handling system 100 may execute computer-readable program code instructions (e.g., software algorithms) parameters, and profiles 118 that may operate on servers or systems, remote data centers, or on-box in individual client information handling systems according to various embodiments herein. In some embodiments, it is understood any or all portions of computer-readable program code instructions (e.g., software algorithms) parameters, and profiles 118 may operate on a plurality of information handling systems 100.

The information handling system 100 may include the hardware processor 102 such as a central processing unit (CPU) or other hardware processing resources (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with computer readable medium 116 storing computer-readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, a mouse 158, video/graphics display device 150, stylus 154, trackpad 156, microphone 160, or speaker 186 among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes computer-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 118 or receives and executes computer-readable program code instructions, parameters, and profiles 118 responsive to a propagated signal, so that a hardware device connected to a network 142 may communicate voice, video, or data over the network 142. Further, the computer-readable program code instructions, parameters, and profiles 118 may be transmitted or received over the network 142 via the network interface device or wireless interface adapter 134.

The information handling system 100 may include a set of computer-readable program code instructions, parameters, and profiles 118 that may be executed to cause the computer system to perform any one or more of the methods or computer-based functions disclosed herein. For example, computer-readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application computer-readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, a video/graphic display device 150, or other wired or wireless I/O devices 148 such as the mouse 158, the stylus 154, the keyboard 152, microphone 160, and the trackpad 156 and other components that may require power when a power button has been actuated by a user. In an embodiment, the PMU 128 may monitor power levels and power may be electrically coupled to the information handling system 100 via various ports in embodiments herein to provide this power. The PMU 128 may be coupled to the bus 124 to provide or receive data or machine-readable code instructions. The PMU 128 may regulate power from a power source such as the battery 130, or AC power adapter 132 such as from one or more ports. In an embodiment, the battery 130 may be charged via the AC power adapter 132 and provide power to the components of the information handling system 100 when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include one or more capacitive sensor systems with the exterior chassis housing used to detect the presence of a user as well as the touch of a user. In an embodiment, the information handling system 100 may include an exterior chassis housing capacitive sensor 168. The exterior chassis housing capacitive sensor 168 may be configured to detect two types of user interaction with the information handling system 100. In an example embodiment, the exterior chassis housing capacitive sensor 168 may detect presence of a user or other human that is close to the information handling system 100. In an embodiment, the exterior chassis housing capacitive sensor 168 may detect user presence up to three feet away from the surface of the exterior chassis housing of the information handling system 100. Again, this may detect changes in the electric field created around the information handling system 100 when the capacitive sensor microprocessor 162 places the exterior chassis housing capacitive sensor 168 in a sensing state by operatively coupling the exterior chassis housing to a capacitive sensor driver circuit 164 and disconnecting the exterior chassis housing from a grounding source as described in embodiments herein. In embodiments herein, the capacitive sensor driver circuit 164 is shown as a separate element and may be a standalone capacitive sensor driver integrated circuit chip in one embodiment or may be software or firmware code instructions executed as part of the capacitive sensor microprocessor 162 integrated circuit chip in other embodiments. Thus, when a human body enters the electric field, the user's body disrupts and interacts with this electric field such that the user's body creates a secondary conductive path to hardware ground that would change the capacitance level detected at the exterior chassis housing capacitive sensor 168. The exterior chassis housing of the information handling system may be decoupled from ground during periodic, brief sense state time duration windows by the capacitive sensor microprocessor 162 and, for example, a field effect transistor (FET) switch to be driven to operate as the exterior chassis housing capacitive sensor 168 in one embodiment. In another embodiment, exterior chassis housing of the information handling system may be decoupled from ground by a high frequency bandpass filter such that the low frequency of the capacitive sensor driver circuit 164 of the capacitive sensor is not grounded by the high pass filter but other higher frequency current (>0.5 GHz RF) or interference is grounded such that the exterior chassis housing may be driven to operate as the exterior chassis housing capacitive sensor 168 in another embodiment. Such a system as in the latter embodiment may further include an electrostatic discharge (ESD) diode to ground for current above a threshold level for grounding of the exterior chassis housing from shocks for safety. Such an ESD diode may also be used with the decoupling from ground during periodic, brief sense state time duration windows of the other embodiments herein by the capacitive sensor microprocessor 162 in other embodiments herein.

Thus, the changes in capacitance levels may be detected by the exterior chassis housing capacitive sensor 168, processed by the capacitive sensor microprocessor 162 and provided to, for example, a hardware processor of the information handling system 100 for use in describing a context and environment in which the information handling system 100 is be used. Additionally, a higher threshold level of change in capacitance levels may be detected by the exterior chassis housing capacitive sensor 168 when a user touches the exterior chassis housing as a touch input, processed by the capacitive sensor microprocessor 162 and provided to, for example, a hardware processor of the information handling system 100 for use as an IO command for control of one or more software, firmware, or hardware systems on the information handling system 100. Touching the capacitive sensor housing for example produces a much higher capacitive change than detecting proximity. The relationship is C=eA/D representing a hyperbola which increases exponentially as distance is reduced making touch and proximity distinguishable.

In an embodiment, the information handling system 100 may further include one or more perimeter capacitive sensors 166. These perimeter capacitive sensors 166 may be placed on an exterior chassis housing along a perimeter of one side of the information handling system 100 such as on a lid of a laptop-type information handling system 100 or a bottom cover of a base of the laptop-type information handling system 100. In one embodiment, the plurality of perimeter capacitive sensors 166 may include four individual perimeter capacitive sensors 166 such that one of each of the perimeter capacitive sensors 166 are placed along an edge or close to an edge of the exterior chassis housing of the information handling system 100 where a user may grip the information handling system 100 while carrying it. In a one embodiment, these plural perimeter capacitive sensors 166 are turned on sequentially. In another embodiment, these plural perimeter capacitive sensors 166 are executed at the same time. As such, each of the perimeter capacitive sensors 166 may be used to detect how the user is carrying the information handling system 100 as well as a transition between the user carrying the information handling system 100 and placing it on a surface such as a desk or inside a bag. To avoid capacitive interference from the exterior chassis housing, the capacitive sensor microprocessor 162 places the plurality of perimeter capacitive sensors 166 in a periodic sensing state by operatively coupling the exterior chassis housing to a capacitive sensor driver circuit 164 and disconnecting the exterior chassis housing from a grounding source as described in embodiments herein for one embodiment or high-pass capacitively grounding the exterior housing all the time with a high pass filter in another embodiment to avoid switching the housing between ground and sense state. Thus, in order to mitigate SAR of the EM energy emitted by an antenna 140 of the information handling system 100 or other context sensing purposes, for example, the placement of the perimeter capacitive sensors 166 relative to how the user is detected as carrying the information handling system 100 operation of the antenna 140 may be changed to be located close to antenna and use that perimeter capacitive sensor 166 to control radiation from that antenna. In a one embodiment, some of the plural edge perimeter capacitive sensors 166 are placed near antennas and when they come in in contact with a user's hand or body they are used to deactivate the impacted/touched antenna.

During operation, the capacitive sensor microprocessor 162 may periodically place each of the exterior chassis housing capacitive sensor 168 and perimeter capacitive sensors 166 into the sense mode. Thus, in an embodiment, the capacitive sensor microprocessor 162 may periodically remove the perimeter capacitive sensors 166 and the exterior chassis housing capacitive sensor 168 from a grounding source and operatively couple these capacitive sensors to the capacitive sensor driver circuit 164 to drive each of the perimeter capacitive sensors 166 and housing capacitive sensor 168 individually. In the shown embodiment, the capacitive sensor microprocessor 162 and the capacitive sensor driver circuit 164 are shown as separate elements and may be separate integrated circuit chips, however, in other embodiments, the capacitive sensor microprocessor 162 and the capacitive sensor driver circuit 164 may be on a single integrated circuit chip and the capacitive sensor driver is executed as software or firmware code instructions.

In an embodiment, this periodic switching during periodic, brief sense state time duration windows to a sense state (e.g., turning on the perimeter capacitive sensors 166 and housing capacitive sensor 168) may be initiated during a repeating interval, for example every half second. For example, each periodic, brief sense state time duration window has a brief duration, such as 5 or 10 ms, although any duration and interval are contemplated in various embodiments. In one example embodiment, each periodic, brief sense state time duration window is less than 15 milliseconds in duration and an interval period between the periodic, brief sense state time duration windows is greater than 0.3 seconds. In an embodiment, each of the exterior chassis housing capacitive sensor 168 and the plural perimeter capacitive sensors 166 may be sequentially activated and placed into the sense state during the brief sense state time duration window in an embodiment. In one example embodiment, where the duration of this sequential sense state of each of the plural perimeter capacitive sensors 166 and the exterior chassis housing capacitive sensor 168 lasts for a period duration of time such as for 5 milliseconds (ms), the exterior chassis housing is in a ground state for around 98% of the periodic time interval of 0.5 seconds during operation of the information handling system 100. For example, 5 ms for exterior chassis housing capacitive sensor 168 as a sensor, and 5 ms for grip sensing by plural perimeter capacitive sensors 166 yields a 10 ms brief sense state time duration window every half second of housing ground total for 2% of time and 98% of time during the repeated interval the exterior chassis housing is in a ground state. As a result, power may be conserved at the information handling system 100 while electromagnetic interference (EMI) performance and current shock safety at the exterior chassis housing is maintained for the information handling system 100 being grounded when the perimeter capacitive sensors 166 and housing capacitive sensor 168 are not in the sense state. The systems and methods described herein, therefore, provide for an additional sensing and IO device modality for the information handling system via its exterior chassis housing according to embodiments herein.

In another embodiment discussed below, during operation, the exterior chassis housing may be high-frequency grounded via a high-pass filter to ground such that the frequencies used to drive the perimeter capacitive sensors 166 and exterior chassis housing capacitive sensor 168 with the capacitive sensor driver circuit 164 are not grounded. In this embodiment, the capacitive sensor microprocessor 162 may periodically or continually place each of the exterior chassis housing capacitive sensor 168 and perimeter capacitive sensors 166 into the sense mode. Thus, in an embodiment, the capacitive sensor microprocessor 162 may periodically, or continually, operatively couple the perimeter capacitive sensors 166 and the exterior chassis housing capacitive sensor 168 to the capacitive sensor driver circuit 164 to drive each of the perimeter capacitive sensors 166 and exterior chassis housing capacitive sensor 168 individually or simultaneously depending on active shielding used. As described, although the shown embodiment, the capacitive sensor microprocessor 162 and the capacitive sensor driver circuit 164 are shown as elements, however, in other embodiments, the capacitive sensor microprocessor 162 and the capacitive sensor driver circuit 164 may be on a single integrated circuit chip with the capacitive sensor driver circuit 164 executed as software or firmware thereon.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2A:
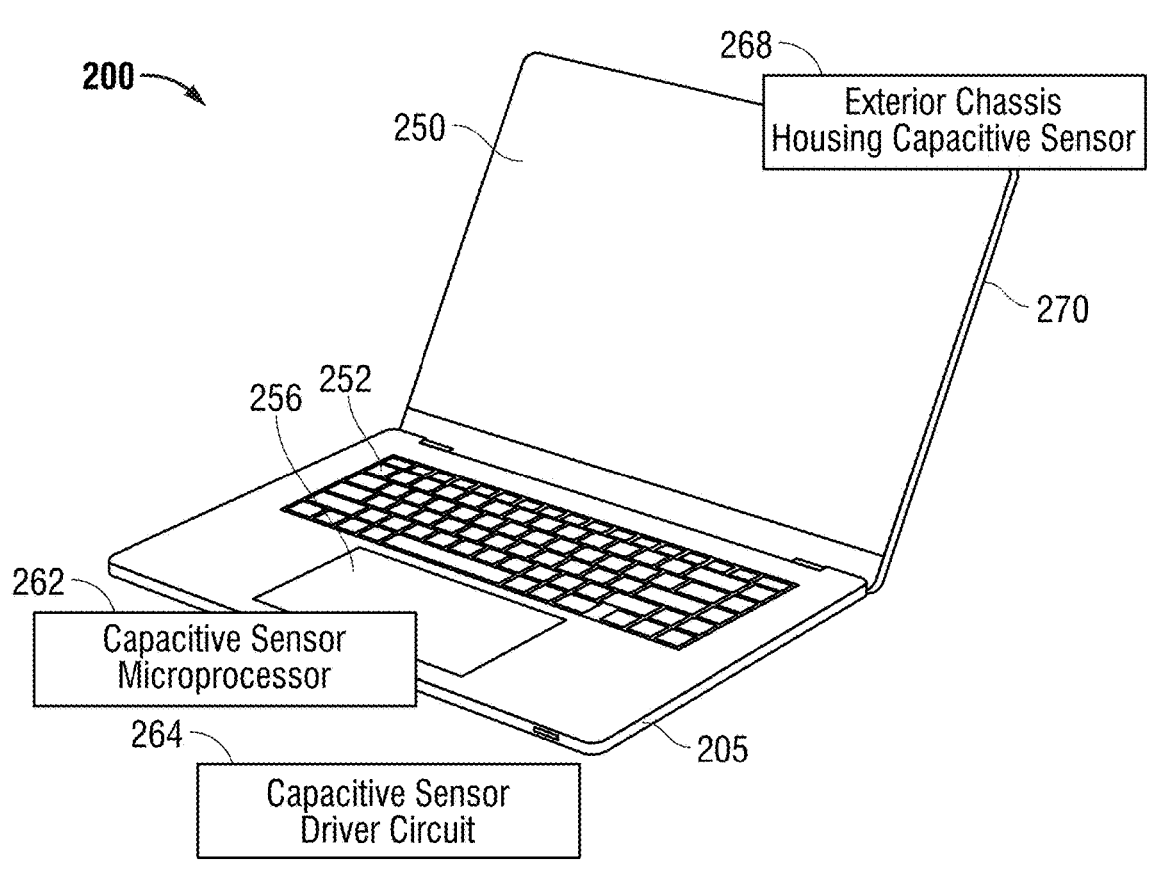
FIG. 2A is a graphic diagram illustrating an information handling system in an open position used to detect user presence near and capacitive touch of a user with an exterior chassis housing at the information handling system according to another embodiment of the present disclosure.
Figure 2B:
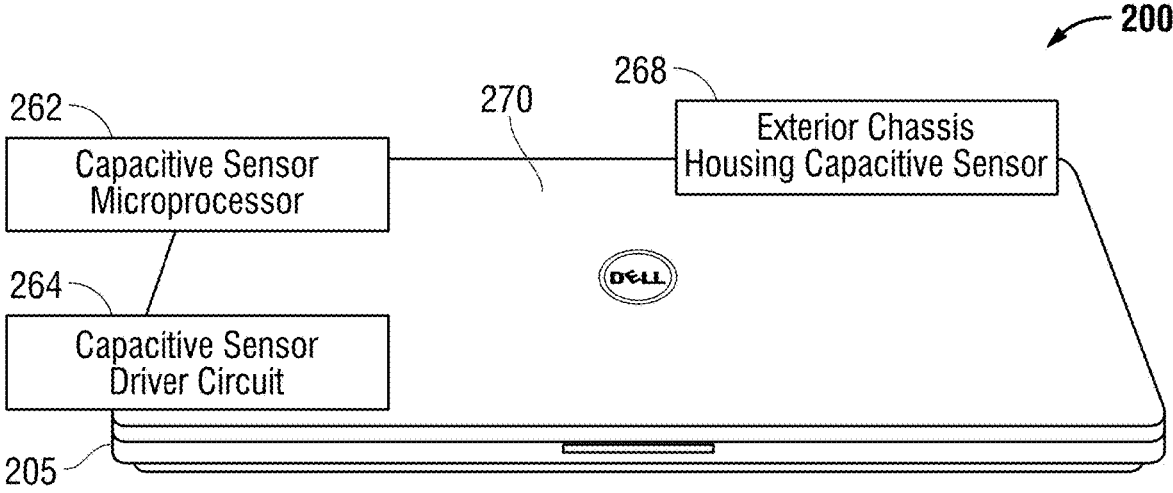
FIG. 2B is a graphic diagram illustrating an information handling system in a closed position used to detect user presence near and capacitive touch of a user with an exterior chassis housing at the information handling system according to another embodiment of the present disclosure.

FIG. 2A is a graphic diagram illustrating an information handling system 200 in an open position used to detect user presence near or capacitive touch of a user at an exterior chassis housing of the information handling system 200 according to another embodiment of the present disclosure. Similarly, FIG. 2B is a graphic diagram illustrating the information handling system 200 in a closed position used to detect human presence near and capacitive touch of a user at an exterior chassis housing of the information handling system 200 according to another embodiment of the present disclosure.

As described herein, the exterior chassis housing capacitive sensors 268 may include an exterior chassis housing of the information handling system 200. In some embodiments, the exterior chassis housing of an information handling system 200 may operate as an exterior chassis housing capacitive sensor 268 according to embodiments herein. This exterior chassis housing may include any portion of those surfaces touchable by a user in an embodiment. For example, the exterior chassis housing may include a lid housing 270 or top lid cover also known as an A-cover. Additionally, the exterior chassis housing may include a keyboard housing 274 also known as a C-cover. The exterior chassis housing may also include a base housing 272 or bottom also known as a D-cover. Even a bezel of the display 250 may be part of the exterior chassis housing that may operate as an exterior chassis housing capacitive sensor 268 according to embodiments herein. Each of the lid housing 270, keyboard housing 274, and base housing 272 may be made of a conductive material such as aluminum (Al). In other embodiments, the exterior chassis housing of an information handling system 200 may be made of another material of sufficient capacitance conductivity, such as 50 ohms, in embodiments herein.

In one embodiment herein, a capacitive sensor microprocessor 262 may conduct periodic switching during periodic, brief sense state time duration windows to turn on the exterior chassis housing capacitive sensor 268 to a sense state once during a sense state periodic interval. The sense state interval between periodic, brief sense state time duration windows may be every half second, for example, and for a brief duration, such as 5 or 10 ms, although any duration and interval are contemplated in various embodiments. In one example embodiment, each periodic, brief sense state time duration window is less than 15 milliseconds in duration and an interval period between the periodic, brief sense state time duration windows is greater than 0.3 seconds. To turn on the exterior chassis housing capacitive sensor 268, the capacitive sensor microprocessor 262 may decouple the exterior chassis housing from ground and operatively connect the capacitive sensor driver circuit 264 for the periodic, brief sense state time duration windows. Thus, in an embodiment, the lid housing 270, keyboard housing 274, and base housing 272 may be grounded around 98% of the time until the time period to unground the lid housing 270 and base housing 272 occurs in order to switch the exterior chassis housing capacitive sensor 268 (formed by, at least, by the lid housing 270, keyboard housing 274, and base housing 272) to a sense state during the brief sense state time duration window as described herein. Thus, as the capacitive sensor microprocessor 262 switches the exterior chassis housing capacitive sensor 268 to a sense state, and the presence of the user may be detected within a certain distance from the information handling system 200 (e.g., 2 to 3 feet) as well as detect touch by the user in an embodiment. Again, in embodiments herein the capacitive sensor driver circuit 264 is shown as a separate element and may be a standalone capacitive sensor driver integrated circuit chip in one embodiment or may be software or firmware code instructions executed as part of the capacitive sensor microprocessor 262 integrated circuit chip in other embodiments.

Figure 5:
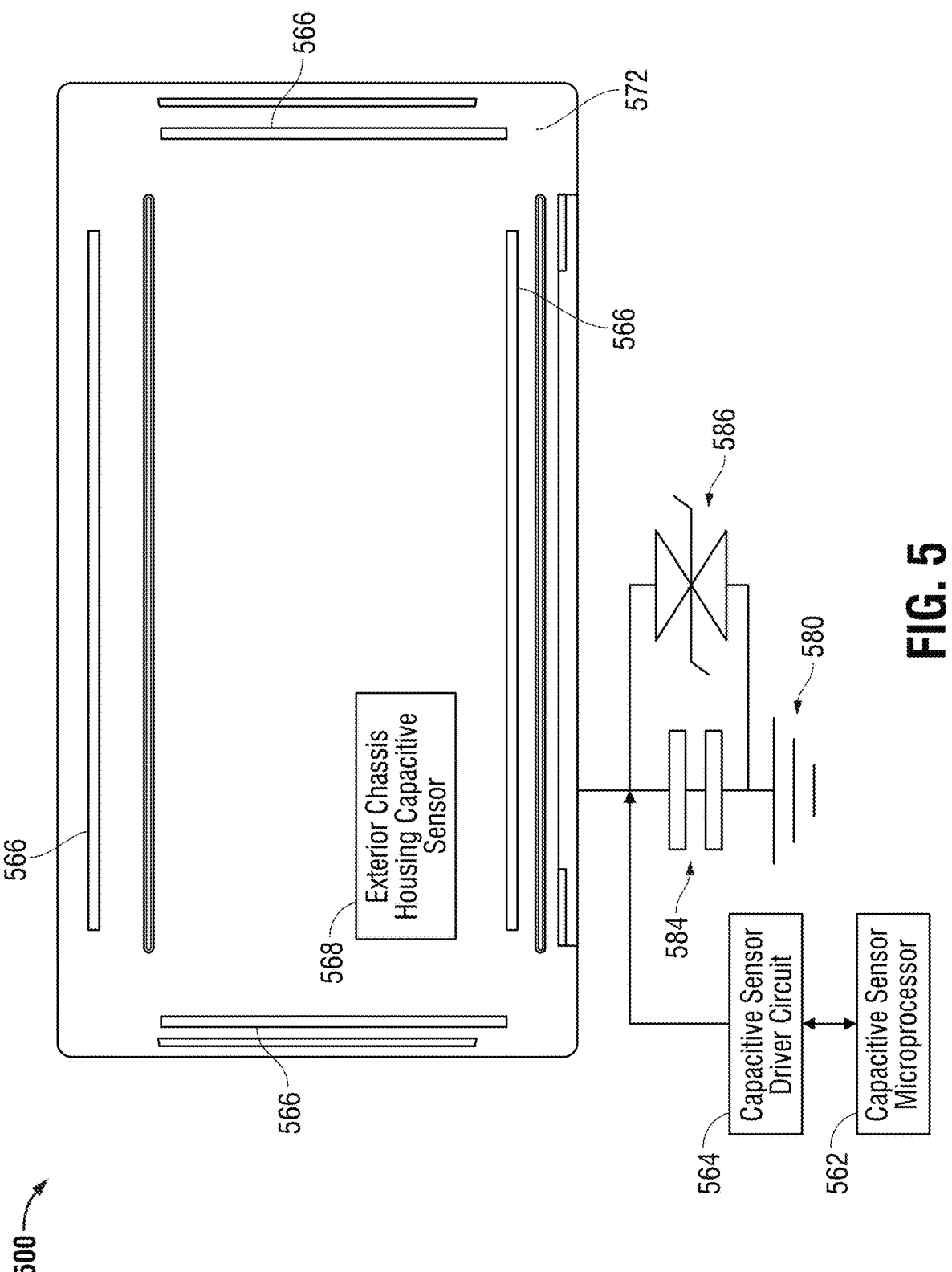
FIG. 5 is a graphic and block diagram illustrating a bottom surface of an information handling system in a closed position used to detect user presence near and capacitive touch of a user at an exterior chassis housing of the information handling system according to another embodiment of the present specification.

In another embodiment, described further in FIG. 5, a high pass filter and electroshock diode may ground the exterior chassis housing while protecting against high frequency electromagnetic interference (EMI) and electric shock. The low frequencies of the capacitive sensor driver circuit 264 to drive the operation of the exterior chassis housing capacitive sensor 268 are not grounded. Thus, in such an embodiment, the capacitive sensor microprocessor 262 switches on the exterior chassis housing capacitive sensor 268 to a sense state, and the presence of the user may be detected within a certain distance from the information handling system 200 (e.g., 2 to 3 feet) as well as detect touch by the user on the exterior chassis housing.

Again, by detecting the presence of a user or other human near the information handling system 200, a hardware processor may use this context data to alter or otherwise manipulate the characteristics or functionality of the information handling system 200. Additionally, the touch of the user at the exterior chassis housing capacitive sensor 268, at a greater level of detected capacitance change, may as be used by the user to provide input to the information handling system 200 as well as provide context data. For example, a user may touch a part of the exterior chassis housing to control a speaker, mute a microphone, communicate software, display screen, or other hardware or functions such that the exterior chassis housing capacitive sensor 268 may detect this touch and interpret this touch as adjusting the same.

As described herein, in some embodiments herein, the information handling system 200 also includes one or more perimeter capacitive sensors (not shown in FIGS. 2A and 2B) and discussed below. These perimeter capacitive sensors may be placed along a perimeter of either of the lid housing 270 or base housing 272 in order to detect the user gripping the information handling system 200 while the user is carrying the information handling system 200 from one location to another. Example perimeter capacitive sensors are shown and described in FIG. 3.

Figure 3:
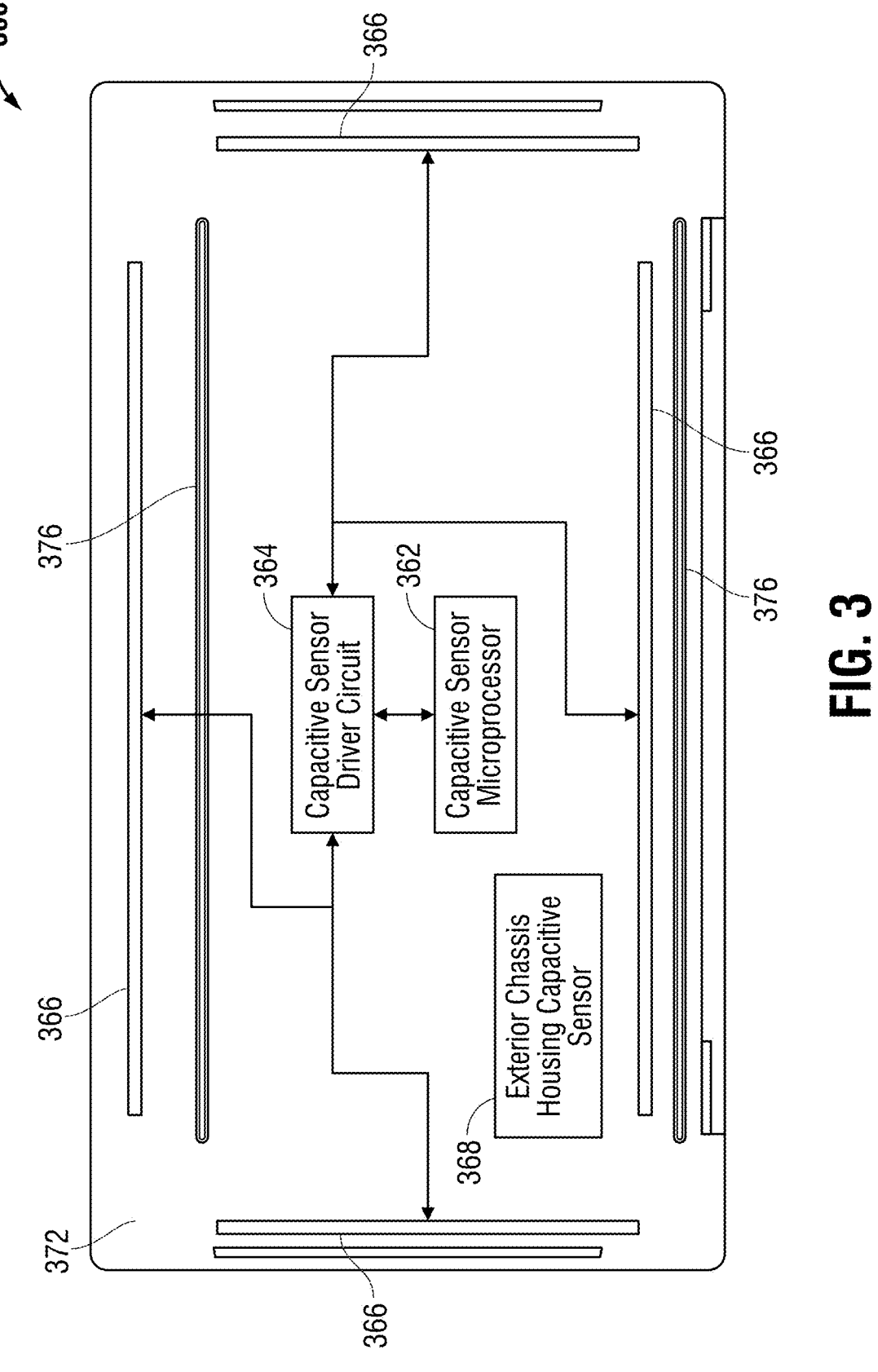
FIG. 3 is a graphic diagram illustrating a bottom surface or base housing of an information handling system used to detect capacitive touch or proximity of a user at an exterior chassis housing of the information handling system according to an embodiment of the present specification.

FIG. 3 is a graphic diagram illustrating a bottom surface or base housing 372 exterior chassis housing of an information handling system 300 used to detect capacitive touch or proximity as well as grip of a user at exterior chassis housing of the information handling system 300 according to an embodiment of the present specification. As described herein, the information handling system 300 may include one or more perimeter capacitive sensors 366 formed on a base housing 372 of the information handling system 300. FIG. 3 shows four individually-operated perimeter capacitive sensors 366 placed on the base housing 372, however in other embodiments any number of individually-operated perimeter capacitive sensors 366 may be used. However, the present specification contemplates that the base housing 372 may have more or fewer perimeter capacitive sensors 366 placed on its surface than those shown in FIG. 3. As described herein, instead of placing a perimeter capacitive sensors 366 along a perimeter of the information handling system 300, the perimeter capacitive sensors 366 may be placed at those locations where the computer feet 376 are formed into the base housing 372 of the information handling system 300. In one embodiment, an insulating layer forming a top layer of the perimeter capacitive sensors 366 may be made of a rubber material acting as feet such that a user may not know that the perimeter capacitive sensors 366 are formed onto the base housing 372 of the information handling system 300 in an embodiment, however the rubber material may still have sufficient capacitive conductance for capacitive changes to be detected by the perimeter capacitive sensors 366.

As described herein, each of the perimeter capacitive sensors 366 may be operatively coupled to a capacitive sensor driver circuit 364 and capacitive sensor microprocessor 362. In one embodiment, the capacitive sensor microprocessor 362 may periodically decouple the perimeter capacitive sensors 366 and the exterior chassis housing capacitive sensor 368 (part shown as the base housing 372 exterior chassis housing in FIG. 3) from a grounding source and operatively couple these capacitive sensors to the capacitive sensor driver circuit 364 to drive each of the perimeter capacitive sensors 366 and exterior chassis housing capacitive sensor 368 individually during periodic, brief sense state time duration windows. In an embodiment, this periodic switching to a sense state (e.g., tuning on the perimeter capacitive sensors 366 and housing capacitive sensor 368) may be initiated every half second, for example, or over any other periodic time interval between periodic, brief sense state time duration windows. In an embodiment, each of the exterior chassis housing capacitive sensor 368 and the group of four perimeter capacitive sensors 366 may be sequentially activated during the periodic, brief sense state time duration windows and placed into the sense state sequentially in each brief sense state time duration window. The duration of this sequential sense state of each of the four perimeter capacitive sensors 366 and the exterior chassis housing capacitive sensor 368 during these periodic, brief sense state time duration windows may last for an example period of time, such as for 5 milliseconds (ms). Thus, a ground state is active on the exterior chassis housing for a large majority of each period interval, for example for around 98% of each of the interval time periods, while the information handling system 300 is operating. As a result, power may be conserved at the information handling system 300 while EMI performance is maintained for a significant period of time with the exterior chassis housing of the information handling system 300 being grounded when the perimeter capacitive sensors 366 and housing capacitive sensor 368 are not in the sense state. In other embodiments, a high bandpass filter, or high pass filter, may be used to high frequency EMI along with an electrostatic discharge diode to discharge current in the exterior chassis housing to enable operation of the perimeter capacitive sensors 366 and exterior chassis housing capacitive sensor 368 to sense capacitance via the exterior chassis housing, such as base housing 372 according to embodiments herein. The high pass filter embodiment eliminates the need of the capacitive sensor microprocessor 362 to switch the exterior chassis housing between ground and sense state by providing an high frequency current path to resolve/ground EMI interference in the exterior chassis housing (for high frequencies >0.5 GHz) and at the same time allows the high-frequency current grounded exterior chassis housing as well as the perimeter capacitive sensors 366, to work as capacitive sensors due to the capacitive sensor lower frequencies (<500 KHz) during operation.

In yet other embodiments, the computer base chassis 372, and a display device housing, such as lid housing 270, are driven as two separate exterior chassis housing capacitive sensors 368 instead of one allowing only for both the computer base chassis 372, and a display device housing (lid housing 270) combined. With embodiments where the computer base chassis 372, and a display device housing, such as lid housing 270 are separate exterior chassis housing capacitive sensors 368, field combining between the two halves of the information handling system 300 for smarter detections and distinguishing with higher resolution a user's engagement is available such as detecting a user standing or sitting in front of the open lid housing (e.g., 270 or a hand above base housing 372 surface when typing.

Figure 4:
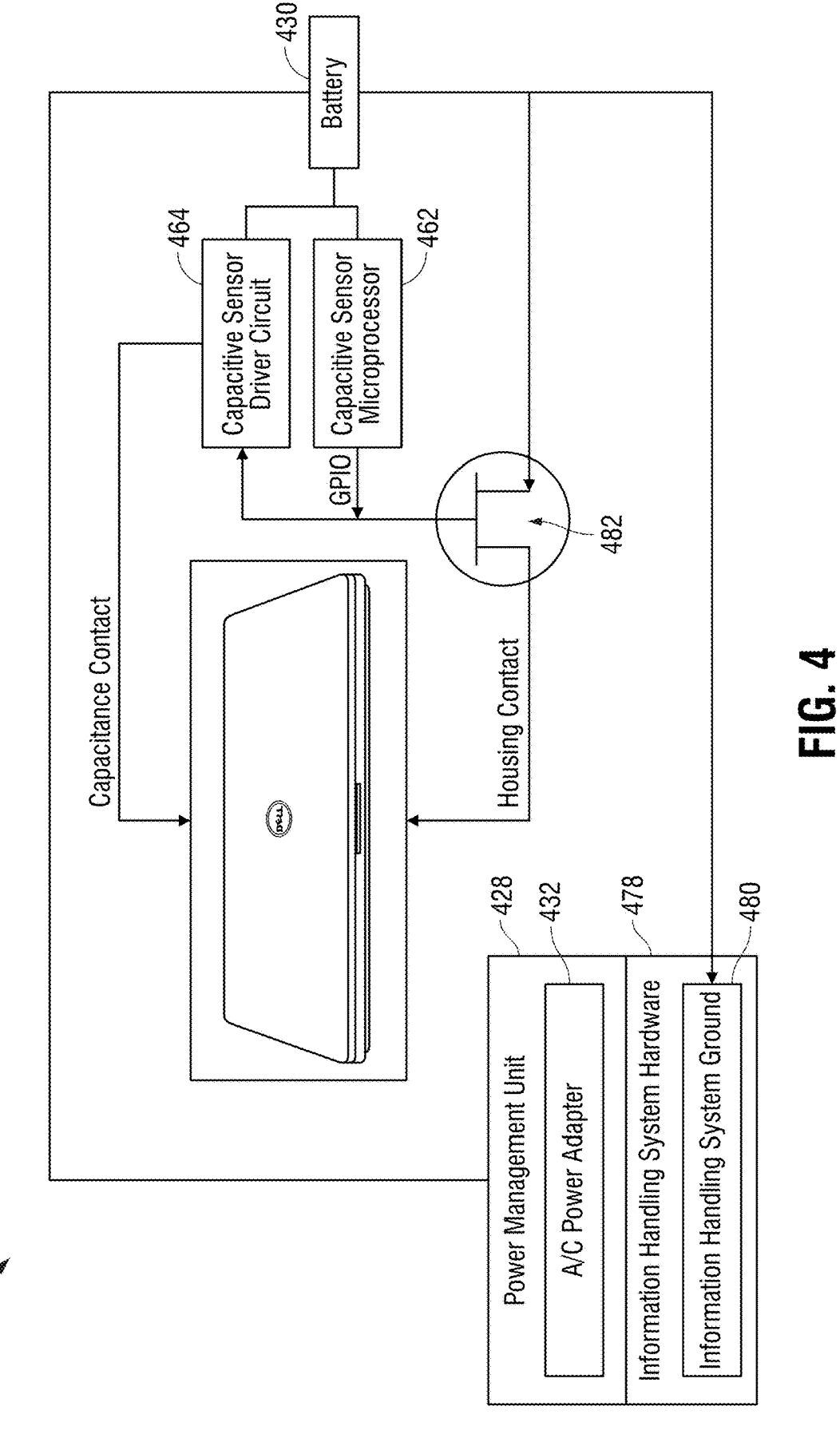
FIG. 4 is a graphic and block diagram illustrating an information handling system in a closed position used to detect user presence near and capacitive touch of a user at an exterior chassis housing of the information handling system according to an embodiment of the present specification.

FIG. 4 is a graphic and block diagram illustrating an information handling system 400 in a closed position used to detect user presence near and capacitive touch of a user at an exterior chassis housing of the information handling system 400 according to an embodiment of the present specification. As described herein, the information handling system 400 may include an exterior chassis housing capacitive sensor and one or more perimeter capacitive sensors such as those described and shown in, for example, FIGS. 2A, 2B, and 3.

Detected changes in the capacitance at the perimeter capacitive sensors and housing capacitive sensor may indicate that a user is gripping or touching some portion of the exterior chassis housing capacitive sensor and/or perimeter capacitive sensors, indicate that the information handling system is laying on a user's body, or may indicate a user is near to the information handling system 400. Again, the exterior chassis housing may be driven as an exterior chassis housing capacitive sensor and placed in a sensing state by operatively coupling the exterior chassis housing to a capacitive sensor driver circuit 464 and capacitive sensor microprocessor 462 while decoupling the exterior chassis housing from a grounding (or using HP filter to effectively decouple sensor from ground while maintain AC ground for higher frequencies/EMI) source during periodic, brief sense state time duration windows in an embodiment. This may be done by the capacitive sensor microprocessor 462, powered by a battery 430 for example, generating control signals to toggle a field-effect transistor (FET) 482 to couple and de-couple the exterior chassis housing from ground. The control signals to the FET 482 may place the exterior chassis housing in a grounded state while sequentially connecting the group of the perimeter capacitive sensors and the exterior chassis housing capacitive sensor, or simultaneously in some embodiments, to a sensing state with the capacitive sensor driver circuit 464. Thus, the capacitive sensor microprocessor 462 may control how often and for what duration each of the perimeter capacitive sensors and housing capacitive sensor are placed in the sensing state during periodic, brief sense state time duration windows. In an embodiment, the capacitive sensor microprocessor 462 may include firmware or software that executes a timing algorithm that directs interval and duration of the periodic, brief sense state time duration windows for decoupling from ground and placing the perimeter capacitive sensors and exterior chassis housing capacitive sensor the sensing state. As described in embodiments herein, the perimeter capacitive sensors and the housing capacitive sensor are sequentially placed in the sensing state during the periodic, brief sense state time duration windows in some embodiments. In other embodiments, such as where an active shielding layer is used between the perimeter capacitive sensors and exterior chassis housing capacitive sensor, the perimeter capacitive sensors and exterior chassis housing capacitive sensor are simultaneously placed in the sensing state during the periodic, brief sense state time duration windows in another embodiment.

In an embodiment, when a human body enters the electric field created by the exterior chassis housing capacitive sensor when placed in the sensing state, the user's body disrupts and interacts with this electric field such that the user's body creates a secondary conductive path to device ground that would change the capacitance level detected at the exterior chassis housing capacitive sensor during these periodic, brief sense state time duration windows. These changes in capacitance levels may be detected by the exterior chassis housing capacitive sensor driven by the capacitive sensor driver circuit 464, processed by the capacitive sensor microprocessor 462 and provided to, for example, a hardware processor of the information handling system 400 for use in describing a context and environment in which the information handling system 400 is being used. Multiple periodic, brief sense state time duration windows and capacitance detection may be used in embodiments herein for sensor applications. A user touching the external chassis housing capacitive sensor may register a larger change in capacitance level detected during these periodic, brief sense state time duration windows as well and may be processed by the capacitive sensor microprocessor 462 and provided to, for example, a hardware processor of the information handling system 400 for use as IO input commands.

The perimeter capacitive sensors also detects grip touch by the user such as when the user is carrying the information handling system 400 as well as a transition between the user carrying the information handling system 400 and placing it on a surface such as a desk or inserting the device in a bag, or grabbing the device from a bag. Thus, in order to mitigate SAR of the EM energy emitted by an antenna of the information handling system 400 or other purposes, for example, the placement of the perimeter capacitive sensors relative to how the user is detected as carrying the information handling system 100 operation of the antenna 140 may be changed so that its EM energy is beamformed away from the user by locating the perimeter capacitive sensor near the antenna to control it. In one embodiment, the information handling system contains multiple distributed antennas in the base chassis, such that locating plural perimeter capacitive sensors adjacent to the antennas may be used to control their radiation when the hand/body touches the area of the perimeter capacitive sensors near the antennas. Similar to the exterior chassis housing capacitive sensor, execution of the firmware or software of the capacitive sensor microprocessor 462 also determines when the control signals are sent to the FET 482, thereby grounding the exterior chassis housing to mitigate interference and directing the capacitive sensor driver circuit 464 to place the perimeter capacitive sensors in the sensing state during the periodic, brief sense state time duration windows. The capacitive sensor driver circuit 464 and capacitive sensor microprocessor 462 may detect which of a plurality of peripheral capacitive sensors at known locations detects a user's grip such that the information handling system may determine location of a user's grip on the external chassis housing in embodiments herein.

During operation, the capacitive sensor microprocessor 462 may periodically place each of the exterior chassis housing capacitive sensor and perimeter capacitive sensors into the sense mode during these periodic, brief sense state time duration windows. As described in embodiments herein, activation of the sense modes for the exterior chassis housing capacitive sensor and perimeter capacitive sensors may be sequential or simultaneous, depending on the use of active shielding between them. Thus, in an embodiment, the capacitive sensor microprocessor 462 may periodically remove the perimeter capacitive sensors and the exterior chassis housing capacitive sensor from a grounding source and operatively couple these capacitive sensors to the capacitive sensor driver circuit 464 to drive each of the perimeter capacitive sensors and housing capacitive sensor individually during the periodic, brief sense state time duration windows.

In an embodiment, this periodic switching to a sense state may be initiated every half second, for example, or any other time period. In an embodiment, each of the exterior chassis housing capacitive sensor and the four perimeter capacitive sensors may be sequentially activated and placed into the sense state. The duration of this sequential sense state of each of the four perimeter capacitive sensors and the exterior chassis housing capacitive sensor may last for a period of time such as for 5 milliseconds (ms). This allows the system to be in a ground state for around 99% of the time that the information handling system 400 a 0.5 second repeating interval is used when the system is operating. As a result, power may be conserved at the information handling system 400 while EMI performance is maintained for a significant period of time with the exterior chassis housing of the information handling system 400 being grounded when the perimeter capacitive sensors and housing capacitive sensor are not in the sense state.

FIG. 5 is a graphic and block diagram illustrating a bottom surface of an information handling system 500 in a closed position used to detect user presence near and capacitive touch of a user at an exterior chassis housing of the information handling system 500 according to an embodiment of the present specification. FIG. 5 shows an alternative high pass filter circuitry used to control the grounded state for sensing states of the perimeter capacitive sensors 566 and the exterior chassis housing capacitive sensor 568 as described in embodiments herein. In this embodiment, switching between grounding and sensing is replaced via the high pass filter circuitry that allows exterior chassis housing to be high-frequency grounded all of the time. In this embodiment, the perimeter capacitive sensors 566 and the exterior chassis housing capacitive sensor 568 may work as capacitive sensors in a sense state all of the time or periodically since the high pass filter circuitry grounds high frequencies and acts as open circuit to low frequencies such as those used to the drive perimeter capacitive sensors 566 and the exterior chassis housing capacitive sensor 568 as capacitive sensors.

The example circuitry includes the capacitive sensor microprocessor 562 operatively coupled to the capacitive sensor driver circuit 564. Again, the capacitive sensor microprocessor 562 may execute computer-readable program code instructions or contain firmware that executes a timing algorithm that directs when and how control signals are transmitted to each of the perimeter capacitive sensors 566 and housing capacitive sensor 568 to place one or more of these perimeter capacitive sensors 566 and housing capacitive sensor 568 in the sensing state. The sensing state of the perimeter capacitive sensors 566 and housing capacitive sensor 568 may be periodic and limited in duration to achieve power conservation in embodiments herein.

The capacitive sensor driver circuit 564 may then direct that each of the exterior chassis housing capacitive sensor 568 and perimeter capacitive sensors 566, individually and sequentially, to toggle to a sensing state. In an alternate embodiment the sensors operate at the same time instead of sequentially. The exterior chassis housing, such as bottom surface of base housing 572, is in a high frequency grounded state due to a high pass filter, formed with a high-frequency capacitor 584, to a grounding source in order to mitigate interference for operation of the exterior chassis housing capacitive sensor 568 and perimeter capacitive sensors 566. Because the exterior chassis housing is operatively coupled to a first terminal of the high frequency capacitor 584 acting as a high-pass filter thereby allows high-frequency noise signals to pass to ground while blocking low frequency signals from the capacitive sensor driver circuit 564 driving and sensing the exterior chassis housing capacitive sensor 568 and perimeter capacitive sensors 566. At high frequencies, the high-frequency capacitor 584 behaves as an open circuit because it grounds high-frequency signals while blocking low-frequency signals from ground due to its impedance being inversely proportional to frequency of the signals received at the high frequency capacitor 584. At low frequency output signals driven from the capacitive sensor driver circuit 564, the high frequency capacitor 584 effectively isolates the perimeter capacitive sensors 566 and housing capacitive sensor 568 from the ground, ensuring that the drive signals from the capacitive sensor driver circuit 564 are directed to and capacitive fluctuation sensing signals may be received from the perimeter capacitive sensors 566 and housing capacitive sensor 568 instead of being grounded.

An ESD diode 586 may be added to the circuit to protect exterior chassis housing as well as the circuit and information handling system 500 from voltage spikes or high current caused by electrostatic discharge, for example. This circuit, therefore, allows for the exterior chassis housing of the information handling system 500 to remain grounded while high-frequency noise is removed without disrupting the low-frequency operation of the perimeter capacitive sensors 566 and housing capacitive sensor 568 to detect a user's grip, touch, or proximity in an embodiment of the present disclosure.

Figures 6A, 6B:
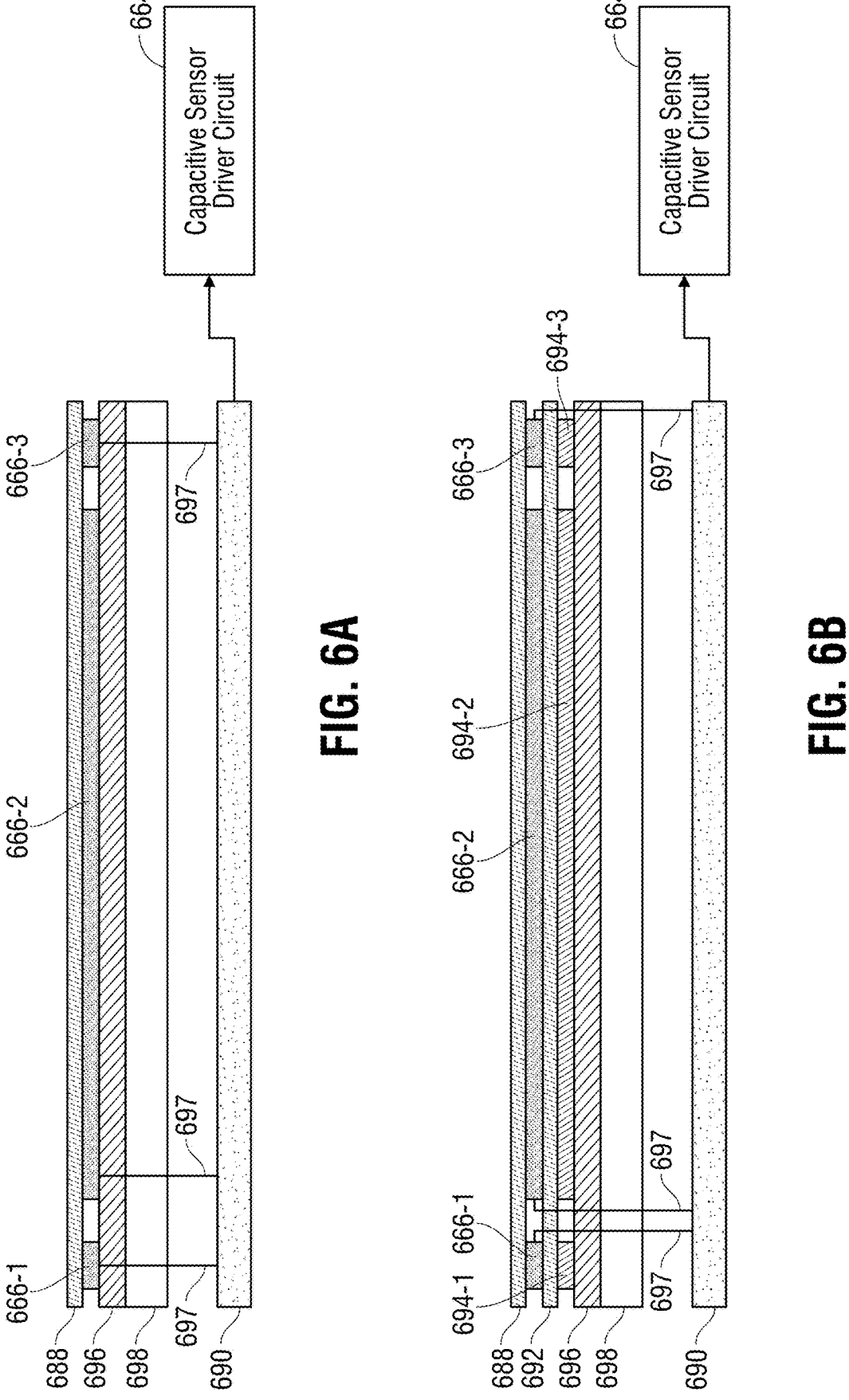
FIG. 6A is a side, cross-sectional view of a housing of an information handling system and a plurality of perimeter capacitive sensors at or on an exterior chassis housing according to an embodiment of the present specification.
FIG. 6B is a side, cross-sectional view of a housing of an information handling system and a plurality of perimeter capacitive sensors at or on an exterior chassis housing according to another embodiment of the present specification.

FIG. 6A is a side, cross-sectional view of an exterior chassis housing of an information handling system and a plurality of perimeter capacitive sensors according to an embodiment of the present specification. FIG. 6A shows three different perimeter capacitive sensors 666-1, 666-2, 666-3 formed on or adhered to a surface of an exterior chassis housing 698 (e.g., a base housing 472, FIG. 4). However, the present specification contemplates that more or fewer than three perimeter capacitive sensors 666-1, 666-2, 666-3 shown in FIG. 6A may be used to detect a user's grip while the user, for example, carries the information handling system.

The stack of layers shown in FIG. 6A may include a first insulating layer 688. As described herein, this first insulating layer 688 may be made of a rubber such that the perimeter capacitive sensors 666-1, 666-2, 666-3 may be placed at a location where computer feet may be placed. In other embodiments, the computer feet may be made of a conductor impregnated rubber and operate as the perimeter capacitive sensors 666-1, 666-2, 666-3 on the exterior chassis housing 698. Thus, the perimeter capacitive sensors 666-1, 666-2, 666-3, in an embodiment, may serve both the purpose of replacing computer feet as well as operate as the perimeter capacitive sensors 666-1, 666-2, 666-3 as described herein. Where the perimeter capacitive sensors 666-1, 666-2, 666-3 are to be separate elements from the computer feet, the first insulating layer 688 may be made of any insulating material but still capacitive when gripped or touched.

Any number of perimeter capacitive sensors 666-1, 666-2, 666-3 may be placed on the surface of the exterior chassis housing 698. Although FIG. 6A shows that each of these perimeter capacitive sensors 666-1, 666-2, 666-3 share a single first insulating layer 688 and are affixed to the exterior chassis housing 698 via a single adhesive layer 696, it is appreciated that each of the individual perimeter capacitive sensors 666-1, 666-2, 666-3 may include their own section of first insulating layer 688 or none at all and their own adhesive layer 696 such that each individual perimeter capacitive sensor 666-1, 666-2, 666-3 may be placed at a perimeter location on the exterior chassis housing 698 of the information handling system at those locations such as shown in FIG. 3 for example. These locations may be where a user may typically grip the exterior chassis housing 698 of the information handling system.

As described, an adhesive layer 696 may be placed below the perimeter capacitive sensors 666-1, 666-2, 666-3 to affix the perimeter capacitive sensors 666-1, 666-2, 666-3 to the surface of the exterior chassis housing 698 of the information handling system. This adhesive layer may permanently secure the perimeter capacitive sensors 666-1, 666-2, 666-3 and first insulating layer 688 to the surface of the exterior chassis housing 698 such that regular use and handling by a user will not degrade the bond between the perimeter capacitive sensors 666-1, 666-2, 666-3 and the exterior chassis housing 698. In an embodiment, each of the first insulating layer 688, the perimeter capacitive sensors 666-1, 666-2, 666-3, and the adhesive layer 696 may be bonded together to prevent separation of these layer.

As described herein, each of the perimeter capacitive sensors 666-1, 666-2, 666-3 are operatively coupled to a capacitive sensor driver circuit 664 and capacitive sensor microcontroller (not shown). This operative coupling, in an embodiment, may be facilitated by the inclusion of one or more electrical leads 697. These electrical leads may be, in the example embodiment shown in FIG. 6A, passed through a via formed through the adhesive layer 696 and the exterior chassis housing 698 of the information handling system. A printed circuit board (PCB) 690 may be used to house the capacitive sensor driver circuit 664 and capacitive sensor microcontroller with the electrical leads 697 from the perimeter capacitive sensors 666-1, 666-2, 666-3 being operatively coupled thereto to facilitate the operative coupling.

FIG. 6B is a side, cross-sectional view of an exterior chassis housing 698 of an information handling system and a plurality of perimeter capacitive sensors 666-1, 666-2, 666-3 according to another embodiment of the present specification. In this example embodiment, the stack shown in FIG. 6B may be used to allow the perimeter capacitive sensors 666-1, 666-2, 666-3 to operate regardless of whether the exterior chassis housing 698 is grounded or not by enabling a driven shield between the perimeter capacitive sensors 666-1, 666-2, 666-3 and chassis housing. In this embodiment, an active shielding layer 694-1, 694-2 or 694-3 may be placed between the perimeter capacitive sensors 666-1, 666-2, 666-3 and the exterior chassis housing 698 to facilitate this method of operation.

The stack of layers shown in FIG. 6B may include a first insulating layer 688 in some embodiments. Again, this first insulating layer 688 may be made of a rubber that is still capacitive, such as infused with conductive material or other methods, such that the perimeter capacitive sensors 666-1, 666-2, 666-3 may be placed at a location on the exterior chassis housing 698 where computer feet may be placed. In other embodiments, the feet themselves may be made of conductive infused rubber or other material and operate as the perimeter capacitive sensors 666-1, 666-2, 666-3 themselves. Thus, the perimeter capacitive sensors 666-1, 666-2, 666-3, in an embodiment, may serve both the purpose of replacing computer feet as well as perimeter capacitive sensors 666-1, 666-2, 666-3 to sense grip of the exterior chassis housing 698 as described herein. Where the perimeter capacitive sensors 666-1, 666-2, 666-3 are to be separate elements from the computer feet, the first insulating layer 688 may be made of any insulating material as long as it permits capacitive detection.

As described in embodiments herein, any number of perimeter capacitive sensors 666-1, 666-2, 666-3 may be placed on the on the exterior chassis housing 698. Although FIG. 6B shows that each of these perimeter capacitive sensors 666-1, 666-2, 666-3 share a single first insulating layer 688, where applicable, and are affixed to the exterior chassis housing 698 via a single adhesive layer 696 with an intermediary second insulating layer 692, it is appreciated that each of the individual perimeter capacitive sensors 666-1, 666-2, 666-3 may include their own section of first insulating layer 688 and adhesive layer 696 such that each individual perimeter capacitive sensor 666-1, 666-2, 666-3 may be placed at a perimeter of the exterior chassis housing 698 for the information handling system at those locations such as shown in FIG. 3 for example where a user may grip the on the exterior chassis housing 698.

In the embodiment shown in FIG. 6B, a second insulating layer 692 is placed below the perimeter capacitive sensors 666-1, 666-2, 666-3. This is done so that the perimeter capacitive sensors 666-1, 666-2, 666-3 may be electrically isolated from the active shielding layer 694-1, 694-2, 694-3 formed below the second insulating layer 692. This active shielding layer 694-1, 694-2, 694-3 may help to reduce electrical interference, enhance signal quality, and improve sensing accuracy by managing electromagnetic coupling and electric field distribution that may occur during those situations when the perimeter capacitive sensors 666-1, 666-2, 666-3 are placed in a sensing state while the exterior chassis housing 698 is not grounded for example. However, this active shielding layer 694-1, 694-2, 694-3 enables the perimeter capacitive sensors 666-1, 666-2, 666-3 to be active at the same period when the exterior chassis housing 698 is not grounded, such as when operating as an exterior chassis housing capacitive sensor according to embodiments herein. This may enable reduction in the duration of the grounding decoupling in embodiments herein. In an embodiment, this active shielding layer 694-1, 694-2, 694-3 may be operatively coupled to a signal source that provides a matching voltage of the driving signal provided to the perimeter capacitive sensors 666-1, 666-2, 666-3.

As described, an adhesive layer 696 may be placed below the perimeter capacitive sensors 666-1, 666-2, 666-3 to affix the perimeter capacitive sensors 666-1, 666-2, 666-3 and the active shielding layer 694-1, 694-2, 694-3 to the surface of the exterior chassis housing 698 of the information handling system. This adhesive layer may permanently secure the perimeter capacitive sensors 666-1, 666-2, 666-3 and any insulating layers 688 and 692 to the surface of the exterior chassis housing 698 such that regular use and handling by a user will not degrade the bond between the perimeter capacitive sensors 666-1, 666-2, 666-3 and the exterior chassis housing 698. In an embodiment, each of any first insulating layer 688, the perimeter capacitive sensors 666-1, 666-2, 666-3, the active shielding layer 694-1, 694-2, 694-3, the second insulating layer 692, and the adhesive layer 696 may be bonded together to prevent separation of these layer.

Again, each of the perimeter capacitive sensors 666-1, 666-2, 666-3 are to be operatively coupled to a capacitive sensor driver circuit 664 and capacitive sensor microcontroller (not shown). This operative coupling, in an embodiment, may be facilitated by the inclusion of one or more electrical leads 697. These electrical leads may be, in the example embodiment shown in FIG. 6A, passed through a via formed through the active shielding layer 694-1, 694-2, 694-3, the adhesive layer 696, and the exterior chassis housing 698 of the information handling system. A printed circuit board (PCB) 690 may be used to house the capacitive sensor driver circuit 664 and capacitive sensor microcontroller with the electrical leads 697 from the perimeter capacitive sensors 666-1, 666-2, 666-3 being operatively coupled thereto to facilitate the operative coupling.

Figure 7:
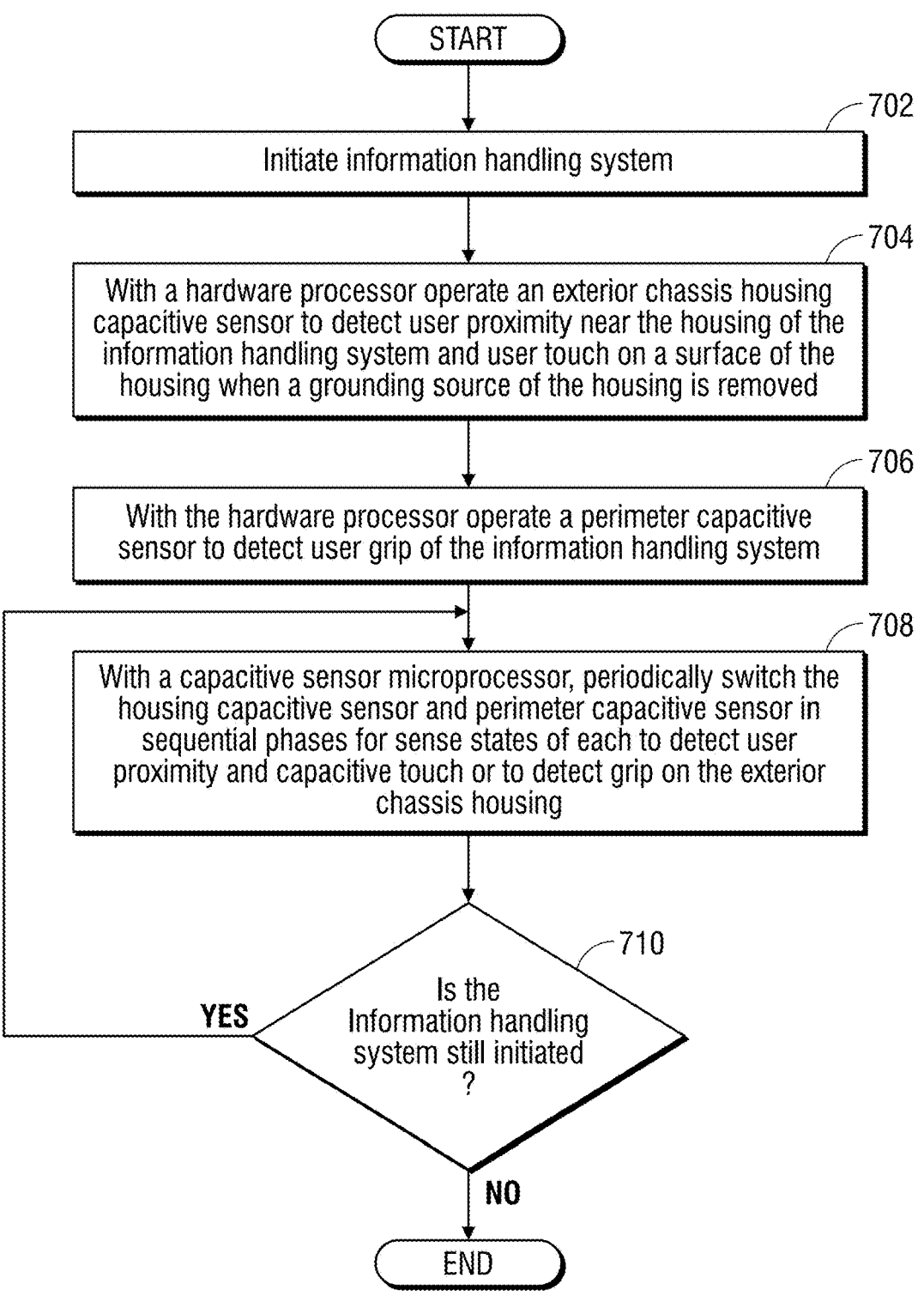
FIG. 7 is a flow diagram showing a method of executing computer-readable program code instructions to detect user presence near and capacitive touch of a user with an exterior chassis housing at the information handling system according to an embodiment of the present disclosure.

FIG. 7 is a flow diagram showing a method 700 of executing computer-readable program code instructions to detect user presence near and capacitive touch of a user at the exterior chassis housing of the information handling system according to an embodiment of the present disclosure. According to embodiments herein, the information handling system has plural capacitive sensor capabilities which may conflict at its exterior chassis housing without the embodiments herein. The information handling system of the present embodiments includes using the exterior chassis housing as an exterior chassis housing capacitive sensor by periodic disengagement of chassis ground or high pass filter to ground alternating current but unground direct current. The information handling system of the present embodiments also includes one or more perimeter capacitive sensors attached to a surface of the exterior chassis housing and also operating during an ungrounded chassis period in some embodiments.

At block 702, the information handling system may be initiated. This may include a user actuating a button that causes the PMU of the information handling system to provide power to the hardware processor and other hardware components of the information handling system.

The method 700 may include, at block 704, operating an exterior chassis housing capacitive sensor to detect user proximity near the exterior chassis housing of the information handling system and user touch on a surface of the exterior chassis housing when a grounding source of the exterior chassis housing is removed. Removal of grounding of the exterior chassis housing is during periodic, brief sense state time duration windows, such as for 5 ms or 10 ms and the exterior chassis housing is otherwise grounded as controlled via a capacitive sensor microprocessor or other hardware processing in the information handling system. As described herein, the exterior chassis housing capacitive sensor may be configured to detect two types of user interaction with the information handling system when in a sense state during the ungrounded window of time which occur periodically, such as every half second or at another periodic repetition interval.

In an example embodiment, the exterior chassis housing capacitive sensor may detect presence of a user or other human that is close to the information handling system. In an embodiment, the exterior chassis housing capacitive sensor may detect user presence up to three feet away from the surface of the exterior chassis housing of the information handling system. Again, this may detect changes in the electric field created around the information handling system when the capacitive sensor microprocessor places the exterior chassis housing capacitive sensor in a sensing state by operatively coupling the exterior chassis housing to a capacitive sensor driver circuit and decoupling the exterior chassis housing from a grounding source during the brief sense state time duration window. Thus, when a human body enters the electric field, the user's body disrupts and interacts with this electric field such that the user's body creates a secondary conductive path that would change the capacitance level detected at the exterior chassis housing capacitive sensor. These changes in capacitance levels may be detected from the exterior chassis housing capacitive sensor by the capacitive sensor driver circuit and capacitive sensor microprocessor, processed by the capacitive sensor microprocessor and provided to, for example, a hardware processor of the information handling system as an input command or sensing data for use in describing a context and environment in which the information handling system is be used.

Additionally, the touch of the user at the exterior chassis housing capacitive sensor during the periodic brief sense state time duration windows may as be used by the user to provide input to the information handling system as well as provide context data. For example, a user may touch any part of the exterior chassis housing on the exterior chassis housing such that the exterior chassis housing capacitive sensor may detect this touch and interpret this touch as increasing or decreasing the volume of a speaker or as some other function. It is appreciated that the touch may occur at any location on the surface of the exterior chassis housing of the information handling system and be used to provide input to the information handling system or provide other contextual information as described herein. In an embodiment, these user touches may be detected when a higher level of capacitance is detected at the exterior chassis housing capacitive sensor, such as above a threshold touch capacitance level, and may, therefore, be distinguished between user presence detection.

The method 700 also includes, at block 706, a hardware processor such as the capacitive sensor microcontroller operating a perimeter capacitive sensor on an exterior chassis housing, such as at a perimeter location of the exterior chassis housing where a user may grip, to detect user grip of the information handling system. The capacitive sensor microprocessor may periodically remove the perimeter capacitive sensors, along with the exterior chassis housing capacitive sensor for the brief sense state time duration window from a grounding source and operatively couple these capacitive sensors to the capacitive sensor driver circuit to drive each of the exterior chassis housing capacitive sensor and the perimeter capacitive sensors individually. In some embodiments herein, the capacitive detection period of the brief sense state time duration window may be split between the detecting for the exterior chassis housing capacitive sensor and for the perimeter capacitive sensors. In an embodiment, this periodic switching to a sense capacitance by the exterior chassis housing capacitive sensor and the perimeter capacitive sensors during the brief sense state time duration window may be initiated every half second, for example, or any other time period. In other embodiments, where an active shielding layer is disposed between the exterior chassis housing and the perimeter capacitive sensors thereon, the capacitance sense state for the exterior chassis housing capacitive sensor and the perimeter capacitive sensors may occur at the same time during the brief sense state time duration window. This may provide for an even shorter brief sense state time duration window in some embodiments.

In yet other embodiments, where a high-pass filter is used to ground high-frequency interference on the exterior chassis housing, the exterior chassis housing may be used as exterior housing chassis capacitive sensor in an always-on sense state as can the perimeter capacitive sensors thereon. In some embodiments, the capacitance sense state for the exterior chassis housing capacitive sensor and the perimeter capacitive sensors may occur at the same time or during sequential sense state time duration windows.

At block 708, the capacitive sensor microprocessor may continue to periodically place each of the exterior chassis housing capacitive sensor and perimeter capacitive sensors into the sense mode. In an embodiment, the capacitive sensor microprocessor may periodically remove the perimeter capacitive sensors and the exterior chassis housing capacitive sensor from a grounding source during the brief sense state time duration window and operatively couple these capacitive sensors in sequence or simultaneously to the capacitive sensor driver circuit to drive each of exterior chassis housing capacitive sensor and the perimeter capacitive sensors individually during this brief sense state time duration window. In an embodiment, each of the exterior chassis housing capacitive sensor and the four perimeter capacitive sensors may be sequentially activated and placed into the sense state during the periodic, brief sense state time duration window. The duration of this sequential sense state to sense capacitance by the exterior chassis housing capacitive sensor and the perimeter capacitive sensors during the brief sense state time duration window may last for a period of time such as for 5 ms or even 10 ms in an example embodiment. This allows the system to be in a ground state for around 98% of the time that the information handling system is operating when a half second period is used between the brief sense state time duration windows in one example embodiment. Other time durations of the brief sense state time duration window and periods between the brief sense state time duration windows are contemplated in other embodiments. As a result, power may be conserved at the information handling system while electromagnetic interference (EMI) performance and safety grounding of the exterior chassis housing is maintained for a majority portion of time with the exterior chassis housing of the information handling system being grounded when the perimeter capacitive sensors and housing capacitive sensor are not in the sense state.

In yet other embodiments, where a high-pass filter circuit is used to ground high-frequency interference on the exterior chassis housing at block 708, the exterior chassis housing may be used as exterior housing chassis capacitive sensor. In such embodiments, both the exterior housing chassis capacitive sensor and the perimeter capacitive sensors may be placed periodically in a sense state by the capacitive sensor microprocessor in one embodiment or may operate in an always-on sense state in other embodiments. In various embodiments, the capacitance sense state for the exterior chassis housing capacitive sensor and the perimeter capacitive sensors may occur at the same time or during sequential sense state time duration windows when high-pass filter circuit is used to ground high-frequency interference on the exterior chassis housing.

The method 700 may continue to block 710 to determine if the information handling system is still initiated. Where the information handling system is still initiated, the method 700 proceeds to block 708 to continue with periodically switch the exterior chassis housing capacitive sensor and perimeter capacitive sensor to a sense state to detect user proximity and capacitive touch. Then the method 700 may proceed according to embodiments described herein. Where the information handling system is no longer initiated, the method 700 may end.

The blocks of the flow diagrams of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer-readable program code instructions to detect user presence near and capacitive touch of a user at an exterior chassis housing of the information handling system comprising:

a hardware processor, a data storage device, and a power management unit (PMU) to provide power to the hardware processor and data storage device;

an exterior chassis housing capacitive sensor to detect user proximity near the exterior chassis housing of the information handling system and user touch on a surface of the exterior chassis housing when a grounding source of the exterior chassis housing is decoupled;

a perimeter capacitive sensor on the exterior chassis housing to detect user grip of the exterior chassis housing of the information handling system;

a capacitive sensor microprocessor operatively coupled to the exterior chassis housing capacitive sensor and perimeter capacitive sensor to periodically switch the exterior chassis housing capacitive sensor and perimeter capacitive sensor to a sense state to detect user proximity capacitance levels for the user proximity, capacitive touch capacitance levels for the capacitive touch, and grip capacitance levels for the grip by a user; and the capacitive sensor microprocessor to transmit detected user proximity of the user, detected capacitive touch of the user, or detected grip by the user of the exterior chassis housing to the hardware processor of the information handling system for use as capacitive sensor input or capacitive input commands.

2. The information handling system of claim 1 further comprising:

the capacitive sensor microprocessor to periodically decouple the grounding source of the exterior chassis housing and switch the exterior chassis housing capacitive sensor and perimeter capacitive sensor to a sense state during plural periodic, brief sense state time duration windows.

3. The information handling system of claim 1 wherein each periodic, brief sense state time duration window is less than 15 milliseconds in duration and an interval period between the periodic, brief sense state time duration windows is greater than 0.3 seconds.

4. The information handling system of claim 1 further comprising:

the exterior chassis housing decoupled from the grounding source via a high-pass frequency capacitor to ground high frequency interference and an electrostatic discharge diode.

5. The information handling system of claim 1 further comprising:

the perimeter capacitive sensor having a capacitive sensing layer and an adhesive layer for operatively coupling to the surface of the exterior chassis housing; and an electrical lead operatively coupling the capacitive sensing layer to the capacitive sensor microprocessor through a via formed through the adhesive layer and the exterior chassis housing of the information handling system.

6. The information handling system of claim 1 further comprising:

the perimeter capacitive sensor having a capacitive sensing layer, an insulating layer, an active shield layer, and an adhesive layer for operatively coupling to the surface of the exterior chassis housing; and an electrical lead operatively coupling the capacitive sensing layer to the capacitive sensor microprocessor with a via formed through the second insulating layer, the active shield layer, the adhesive layer, and the exterior chassis housing of the information handling system, where the active shield layer shields the perimeter capacitive sensor from the exterior chassis housing operating as the exterior chassis housing capacitive sensor.

7. The information handling system of claim 1 further comprising:

the exterior chassis housing capacitive sensor switched to the sense state by operatively coupling the exterior chassis housing to a capacitive sensor driver circuit and disconnecting the exterior chassis housing from the grounding source during periodic, brief sense state time duration windows.

8. The information handling system of claim 1 further comprising:

the perimeter capacitive sensor switched to the sense state by operatively coupling the exterior chassis housing capacitive sensor to a capacitive sensor driver circuit and disconnecting the perimeter capacitive sensor from the grounding source during periodic, brief sense state time duration windows.

9. A method executing computer-readable program code instructions to detect user presence near and capacitive touch of a user at an exterior chassis housing of an information handling system comprising:

detecting user proximity near the exterior chassis housing of the information handling system and user touch on a surface of the exterior chassis housing with an exterior chassis housing capacitive sensor driven by a capacitive sensor driver circuit and a capacitive sensor microprocessor when a grounding source of the exterior chassis housing is decoupled, where the capacitive sensor microprocessor periodically switches the exterior chassis housing capacitive sensor and a perimeter capacitive sensor to a sense state to detect user proximity capacitance levels and capacitive touch capacitance levels;

detecting user grip of the information handling system via the perimeter capacitive sensor operably coupled to a surface of the exterior chassis housing when the grounding source of the exterior chassis housing is decoupled; and transmitting, via the capacitive sensor microprocessor a detected user proximity, a detected user touch, or a detected user grip as capacitive sensing input to the hardware processor of the information handling system.

10. The method of claim 9 further comprising:

decoupling the grounding source of the exterior chassis housing and sequentially switching the exterior chassis housing capacitive sensor and perimeter capacitive sensor, via the capacitive sensor microprocessor, to a sense state during periodic, brief sense state time duration windows.

11. The method of claim 10, wherein each periodic, brief sense state time duration window is less than 15 milliseconds in duration and an interval period between the periodic, brief sense state time duration windows is greater than 0.3 seconds.

12. The method of claim 9 further comprising:

decoupling the grounding source of the exterior chassis housing via a high-pass frequency capacitor to ground high frequency interference and an electrostatic discharge diode.

13. The method of claim 9 further comprising:

apply voltage to an active shield layer disposed between the exterior chassis housing operation as the exterior chassis housing capacitive sensor and the perimeter capacitive sensor similar to the voltage of the exterior chassis housing capacitive sensor via the capacitive microprocessor.

14. The method of claim 9, wherein the perimeter capacitive sensor is placed into a rubber foot formed on a bottom surface of the exterior chassis housing of the information handling system.

15. The method of claim 9 further comprising:

the exterior chassis housing capacitive sensor switched to the sense state by operatively coupling the exterior chassis housing to the capacitive sensor driver circuit and decoupling the exterior chassis housing from the grounding source; and the perimeter capacitive sensor switched to the sense state by operatively coupling the exterior chassis housing capacitive sensor to the capacitive sensor driver circuit and disconnecting the perimeter capacitive sensor from the grounding source.

16. An information handling system executing computer-readable program code instructions to detect user presence near and capacitive touch of a user at an exterior chassis housing of the information handling system comprising:

a hardware processor, a data storage device, and a power management unit (PMU) to provide power to the hardware processor and data storage device;

the exterior chassis housing being activated with a capacitive sensor driver circuit as an exterior chassis housing capacitive sensor to detect user proximity near the exterior chassis housing of the information handling system and user touch on a surface of the exterior chassis housing when a grounding source of the exterior chassis housing is decoupled;

a perimeter capacitive sensor on the exterior chassis housing to be activated by the capacitive sensor driver circuit to detect user grip of the exterior chassis housing of the information handling system when the grounding source of the exterior chassis housing is decoupled;

a capacitive sensor microprocessor operatively coupled to the exterior chassis housing capacitive sensor and perimeter capacitive sensor to periodically switch the exterior chassis housing capacitive sensor and perimeter capacitive sensor to a sense state to detect user proximity capacitance levels for the user proximity, capacitive touch capacitance levels for the capacitive touch, and grip capacitance levels for the grip by a user; and the capacitive sensor microprocessor to transmit detected user proximity of the user, detected capacitive touch of the user, or detected grip by the user of the exterior chassis housing to the hardware processor of the information handling system for use as capacitive sensor input or capacitive input commands.

17. The information handling system of claim 16 further comprising:

the perimeter capacitive sensor formed on the exterior chassis housing with a first insulating layer, a capacitive sensing layer, a second insulating layer, an active shield layer, and an adhesive layer; and an electrical lead operatively coupling the capacitive sensing layer to the capacitive sensor microprocessor through a via formed through the second insulating layer, active shield layer, the adhesive layer, and the exterior chassis housing of the information handling system.

18. The information handling system of claim 16 further comprising:

the capacitive sensor microprocessor to periodically decouple the grounding source of the exterior chassis housing and sequentially switch the exterior chassis housing capacitive sensor and perimeter capacitive sensor to a sense state during each of plural periodic, brief sense state time duration windows.

19. The information handling system of claim 17 further comprising:

the capacitive sensor microprocessor to periodically decouple the grounding source of the exterior chassis housing and simultaneously switch the exterior chassis housing capacitive sensor and perimeter capacitive sensor to a sense state during plural periodic, brief sense state time duration windows.

20. The information handling system of claim 16 further comprising:

the exterior chassis housing decoupled from the grounding source via a high-pass frequency capacitor to ground high frequency interference and an electrostatic discharge diode.

* * * * *